July 28, 1959  H. AHLBURG ET AL  2,897,089
METHOD OF PRINTING COLOR PHOSPHOR PATTERNS
Filed March 14, 1956
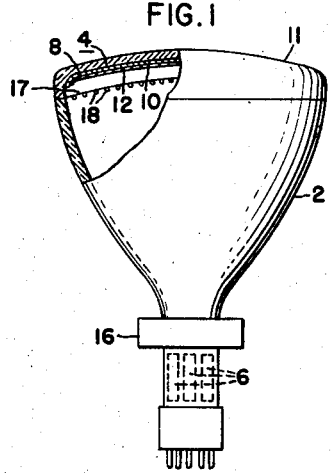
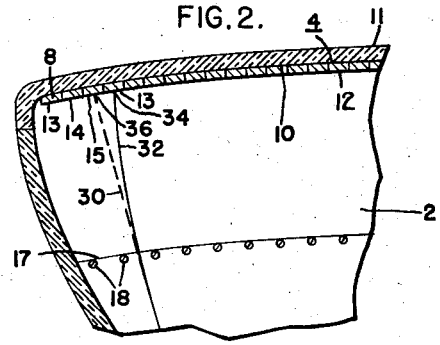
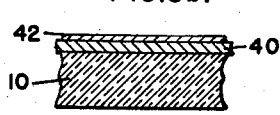
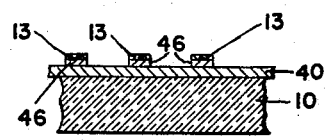
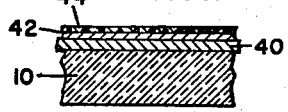
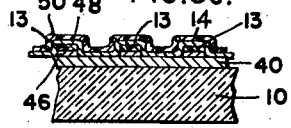
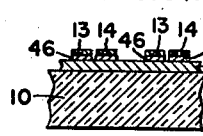
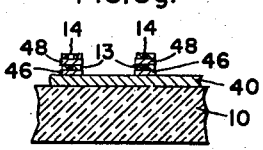
INVENTORS:
HAYO AHLBURG,
GÜNTER K. WESSEL,
BY Nathan J Cornfeld
THEIR ATTORNEY.

United States Patent Office 2,897,089
Patented July 28, 1959

2,897,089

METHOD OF PRINTING COLOR PHOSPHOR PATTERNS

Hayo Ahlburg and Günter K. Wessel, Syracuse, N.Y., assignors to General Electric Company, a corporation of New York Application March 14, 1956, Serial No. 571,465

6 Claims. (Cl. 117—8.5)

This invention relates to a method of making screens or target electrodes for cathode ray tubes wherein the target material of the screen is arranged with precision in a particular pattern. The invention has particular utility in connection with the forming of multiple-phosphor screens for color television picture tubes of the so-called post acceleration type.

Various methods have been employed in the past for producing cathode ray tube screens having fluorescent phosphor or other target material arranged with precision in a particular pattern, but none of the prior art methods of which we are aware has been entirely satisfactory in making screens for post acceleration tubes. Among the known prior art methods is the optical or light ray printing method wherein a master image of the desired pattern is projected optically onto a photo-sensitive resist coated on the face-plate or other screen support member of the tube, the nonexposed portions of the coating being thereafter removed from the screen support member and leaving a pattern of resist to which the phosphor is applied. This technique has certain advantages in forming screens for so-called shadow mask tubes wherein the pattern of electron illumination of the screen conforms to the simple optical shadow of a mask disposed between the screen and the electron source, but it has several disadvantages when forming screens for cathode ray tubes of the post acceleration type. In such tubes the electron beam velocity is modulated after deflection by an electric field formed between the screen and an electron permeable conductive grid or mask spaced therefrom. The trajectory of the electron beam is curved by this accelerating field rather than being a straight line, so that the scan pattern of the beam differs materially from a simple shadow of the grid. Thus various special correctors are required to simulate the electron beam scan pattern with light rays, and the need for such correctors undesirably complicates the printing apparatus. Moreover, with light ray printing the screen cannot be permanently assembled with the grid until after it is printed, and hence during the assembly the grid must be carefully aligned with the previously printed phosphor pattern to avoid beam-phosphor misregistry, a step which is difficult to perform.

Another prior art method employs electron beam exposure of a photographic emulsion to obtain an "electron master" image which incorporates all of the idiosyncrasies of the actual electron beam scan pattern. This method eliminates the need for the optical correctors required in light ray printing, but has the disadvantage that a series of intermediate photographic or other image translating steps is required to transfer the electron master image from the photographic emulsion to a medium to which the phosphor or other target material can be applied.

Accordingly, a principal object of the present invention is to provide an improved method of making cathode ray tube screens of the type having the target material precisely arranged in a particular pattern, which method eliminates the approximation of electron beam trajectory employed with light ray printing, and eliminates the need for the intermediate image transfer steps required with electron beam exposure of photographic emulsion.

Another object is to provide a simple, direct and exact method of making a patterned multiple phosphor cathode ray tube screen.

Another object is to provide a ray printing method of forming a phosphor screen pattern for a cathode ray tube of the post acceleration type wherein the ray exposed print incorporates all of the idiosyncrasies of the electron beam scan pattern and wherein the luminescent phosphor material of the screen may be directly applied to the ray exposed print.

Another object is to provide an improved method of making a record of an electron beam scan pattern in an etchable or selectively dissoluble resist medium which can be developed by etching or dissolution of contrasting areas to give an embossed or three dimensional image.

Briefly, according to the present invention the patterned screen is formed directly on the interior surface of the tube faceplate or other screen support member by coating the plate with a material which has the properties not only of an electron sensitive resist in which an image can be formed by electron exposure and developed to a three dimensional or embossed state by etching or dissolution of contrasting areas, but which material is also capable of serving as a mechanical binder or adhesive for at least temporarily retaining phosphor or other target material in place of its embossed portions. The screen support member coated with such material is then exposed with an electron beam which is subjected to the same deflection forces, post deflection acceleration, fringe fields, and other electrical and magnetic influences as will affect the electron beam in a completed tube. Upon development the portion of the resist forming the image serves as a foundation to which the phosphor or other target material can be applied. By this method not only is the patterned screen formed directly on the screen support member without requiring intermediate formation of a master photographic image of the desired pattern, but since the electron beam which delineates the screen pattern is subjected to the very same trajectory distortions which affect the electron beam of a finished tube, the screen pattern is automatically tailored exactly as required for proper registry of the electron beam and screen target material in operation of the finished tube.

In the accompanying drawing:

Figure 1 is a partially sectionalized view of a cathode ray tube to which the present invention is particularly applicable;

Figure 2 is an enlarged fragmentary sectional view of a portion of the tube of Figure 1; and Figure 3, a through g, illustrates to an enlarged and exaggerated scale successive steps in the screen forming method of the present invention.

Referring to Figure 1 of the drawing there is shown one type of cathode ray tube to which the present invention is particularly applicable. The tube is a color television picture tube of the post acceleration type and includes an evacuated envelope 2 containing a screen or target electrode 4 and a plurality of electron guns 6 arranged to illuminate the screen. The screen consits of a multiple phosphor coating 8 deposited on a support member which in the embodiment shown consists of the interior surface 10 of the envelope faceplate 11. The screen is covered by a thin conductive coating of aluminum 12. The phosphor coating consists of a plurality of groups of different primary color emitting phosphors, each group covering an incremental area of the screen and the different phosphors in each group corresponding in number to the number of guns 6. The individual phosphor segments of each group may be arranged in any desired pattern and may have any desired configuration, being here shown by way of example as vertical stripes 13, 14, 15. A deflection yoke 16 provides angular deflection of the electron beams sufficient to sweep the screen both horizontally and vertically. Between the screen and electron guns is an electron permeable grid or lens mask 17 approximately parallel to and coextensive with the screen, the grid shown consisting of a grille of fine wires 18 arranged parallel to the phosphor stripes and supported from the wall of the tube envelope 2. A suitable bias supply (not shown) provides an electric field between the grille and screen by which each electron beam is focused and accelerated toward the screen, and the grille wires are so spaced and arranged relative to the phosphor stripes as to provide color selection by permitting the electron beam from any one gun to strike only phosphor increments of the particular color for which it is intended. Alternatively, the grid may be constructed from an integral foraminate sheet, the specific construction and mounting arrangement of the grid forming no part of the present invention.

Figure 2 depicts diagrammatically the manner in which the trajectory of the electron beam of the tube of Figure 1 is bent in the post acceleration field. As there shown, the beam travels in a straight line 30 in the field-free region rearward of the grid, but is curved by the field in the space between the grid and screen, as shown at 32. This curvature causes the beam to strike the screen at a point 34 displaced from the projection 36 of the straight line 30, such displacement varying with deflection angle of the beam. Hence, it is impossible to duplicate the trace pattern of the electron beam on the screen with a simple shadow print or optical projection of a mere duplicate of the grid, and elaborate correcting arrangements must be employed during light ray printing to match the light ray pattern on the screen with the electron beam pattern.

Turning now to the details of the screen forming method of the present invention, and with particular reference to Figure 3a through 3g, the surface of the screen support member 10 is first preferably made conductive, so as to render it capable of serving as one electrode of the post acceleration field, by coating it with a thin film of conductive material 40, as shown in Figure 3a. Where the support member is the tube faceplate, or is otherwise intended to be translucent, as in the tube of Figure 1, the conductive coating should also be preferably transparent, and may be for example tin oxide.

The conductive coating 40 is then covered with a coating of a suitable electron exposure sensitive and target material retainable resist. One such resist which has been found to be satisfactory comprises polyvinyl alcohol sensitized with ammonium or potassium dichromate. The resist is preferably applied as a solution including an evaporable solvent. A suitable resist solution which has been found to be satisfactory, for example, may be made by adding 3 to 7 parts by weight of polyvinyl alcohol, obtainable commercially as "Elvanol" 52–22, to 100 parts of water, 40 to 70 parts of denatured ethyl alcohol, and ¼ to 3 parts of ammonium dichromate. Since dichromate sensitized polyvinyl alcohol is also light sensitive, the steps described hereinafter must be performed under dark-room conditions. The resist solution may be applied by pouring it over the conductive coating 40, draining off the excess solution, and drying the remainder. Drying should preferably be accomplished without heating so as to prevent the polyvinyl alcohol from excessively polymerizing. Drying with circulating room air for several minutes, for example, has been found to be quite satisfactory. During the drying process the alcohol and water are evaporated and the resist is reduced to a film 42 overlying coating 40 on the screen support member 10, as shown in Figure 3b.

Alternatively, the order of application of coating 40 and 42 may be reversed, as in a situation where transparency of the coating 40 is not required, and any suitable electron permeable conductive coating may be applied on top of film 42. As a further alternative where transparency is not required, and where compatible with the particular target material to be employed, the conductive layer 40 and resist 42 may be combined by impregnating the resist with sufficient conductive material, such as for example powdered silver or other metal, to constitute the electrical equivalent of a continuous conductive layer. Also the desired target material of the screen may itself be impregnated in the resist, thus serving, where the target material is conductive, the dual role of conductive layer during exposure of the resist and target material upon completion of the screen.

The resist coated support member 10 is then assembled with the grid 17 which will be mated with it in the finished tube. This assembly of support member 10 and grid 17 can be permanent, since there is no need to disassemble these parts at any time during the remainder of the process. The support member 10 and grid 17 are then mounted in an evacuated chamber such as a demountable cathode ray tube (not shown) so constructed and arranged as to subject the electron beam thereof to the identical fields and other electric and magnetic influences as occur in normal operation of the finished tube.

The resist 42 is then exposed by tracing on it the desired pattern, such as the pattern of one of the primary color emitting screen phosphors 13, with an electron beam. When scanned by the electron beam the polyvinyl alcohol polymerizes in the areas impinged by the electrons to a sufficient extent to render it insoluble in water, and thus the scanning pattern of the beam is in effect written into the resist in the form of polymerized areas surrounded by unexposed and hence non-polymerized areas. The degree of polymerization of the resist increases with both exposure time and electron beam current, and since from a production standpoint short exposure times are desirable, relatively high beam currents are preferred. For example exposures for one half minute with a beam current of 60 microamperes have been found to give satisfactory results for patterns of television raster size.

During the course of writing the desired pattern on the resist in the demountable tube, the support member 10 is already assembled with its grid 17 in the exact relative position it will have in the finished tube, the pattern writing beam is subjected to the same angular deflection and accelerating voltages as will occur in the finished tube and all post acceleration fields, fringe fields, and other electrical and magnetic influences on the scanning beam of the finished tube are exactly simulated by the application of suitable potentials to the conductive coating 40 and to the proper elements of the demountable tube. Hence, the pattern writing beam is subjected to all of the electrical influences to which the electron beam of the finished cathode ray tube will be subjected, and the pattern written on the resist 42 will exactly register with that to be traced by the electron beam in the finished tube.

After exposure of the resist, the particular target material whose pattern was traced during the exposure, such as one of the primary color emitting phosphors 13, is applied directly to the resist. Where the target material is a phosphor, it may be conveniently applied by coating the resist with a slurry 44 consisting of additional resist solution with which are mixed particles of the desired phosphor, as shown in Figure 3c. One suitable slurry which has been found to be satisfactory, for example, may be made by combining one part of the resist solution hereinbefore described with one part denatured alcohol and one part phosphor. This slurry overcoating is then dried, as by means of circulating room air for ten minutes, and the phosphor particles therein become attached to and are retained by the underlayer of resist 42. If the target material is of a type such as conductive material, which can be mixed into or otherwise applied to the resist before exposure, of course no additional application of target material is required after exposure.

The exposed resist is then developed by washing in a suitable developing medium, which for polyvinyl alcohol can be lukewarm water to which is preferably added a small amount of detergent, and rinsing in clear water. This etches or dissolves off the unexposed portions of the resist 42 together with the portions of any target material superposed thereon, leaving only the exposed and hence insolubilized portions 46 of the resist together with the particles of phosphor 13 or other target material attached thereto, as shown in Figure 3d. Thus, after the developing process there remains the pattern of the original electron beam tracing, written in a layer of insolubilized resist and attached phosphor particles or other target material. The screen is then dried to fix the target material securely in place.

As an alternative to the sequence of steps above described, the target material may be applied to the resist before exposure, the final result being the same in either case, namely the formation of a pattern of the electron beam tracing, written in an embossed or three dimensional image consisting of resist and attached target material.

For screens consisting of but a single phosphor or other single target material arranged in a particular pattern, the formation of the screen according to the present invention is complete after performance of the steps above described. For screens having a plurality of phosphors or other target materials, however, as in the instant case where the screen includes phosphors 13, 14, and 15 each having its own individual pattern, the support member 10 and grid 17 are returned to the evacuated station and the entire sequence above described is repeated as necessary to apply the different target materials in turn. Before the second and each succeeding exposure the screen is of course completely recoated with resist, this fresh coating 48, as shown in Figure 3e covering not only the portions of the screen washed clear by the preceding developing step but also covering the finished pattern of the previously applied target material. The layer 48 is then exposed, and, before developing, the second target material is applied to it as by rephosphorizing with a slurry 50 containing the second phosphor 14. During the second and each subsequent step, all the unexposed resist together with any target material attached thereto is of course removed from the screen. Where, as with phosphors 13, 14, and 15, the different target material patterns cover different respective areas of the support member 10, the relative position of the support member and the exposing electron beam are shifted between successive exposures as necessary to afford the proper relative position to the successive patterns. This result is shown in Figure 3f. By not shifting the relative position of support member 10 and the exposing beam, however, the second pattern may be superimposed exactly on the first, this technique enabling the building up of a composite target consisting of two or more layers of different target materials. This is illustrated in Figure 3g.

Once the successive pattern forming operations above described are completed, the screen is removed from the evacuated station, all the remaining resist is removed, as by subjecting the screen to a baking operation, leaving only the target materials arranged in the desired positions. The screen may then be aluminized if desired, and the screen and grid assembly is then ready for installation in a cathode ray tube.

While the invention has been described above, by way of example, in connection with ammonium dichromate-sensitized polyvinyl alcohol as the electron-sensitive, target-material retainable, heat-removable resist, the invention is not limited to that particular resist material. To the contrary, various other resist materials have been found to have the necessary properties of electron permeability, electron-sensitivity, and target material-retainability. One such material, for example, is gelatin, i.e. the organic material derived from animal proteins. Gelatin may be applied to the screen support plate in a water solution of sufficient concentration to yield a suitable film thickness when dried. After drying, the film may be suitably sensitized by immersion in a 2 to 3% water solution of ammonium dichromate, again dried, and then exposed by an electron beam. Exposure for five minutes at ten microamperes beam current, for example, gives satisfactory results for patterns of television picture size. The exposed film may then be slurried, using a slurry for example of about 2 parts gelatin, 1 part water, and 1 part phosphor target material. After drying, the screen may then be developed by washing in warm water.

Other resist materials which give satisfactory results are photo-resists such as cinnamic acid esters of polyvinyl alcohol and cellulose of the type described in U.S. Patent 2,610,120, iuused to L. M. Minsk et al. This material may, for example, be applied to the screen support member dissolved in a suitable compatible solvent, such as chlorobenzene and toluene, dried to form the film 42, and exposed for approximately three minutes at ten microamperes. The photo resist is then treated to render the exposed portions thereof insoluble by immersing in a suitable developer, such as trichloroethylene. The phosphor may then be applied in the form of a slurry, as in the manner hereinbefore described. One suitable slurry may consist, for example, of 1 part photo resist, 1 part compatible solvent, and 1 part phosphor. After drying the soluble portions of the resist may then be removed, to reveal the latent image formed by the exposed areas, by washing in water.

The above method has several advantages in forming screens for cathode ray tubes, especially those of the post acceleration type. No elaborate apparatus is required to approximate electron trajectory as is the case with light ray printing, and no photographic transfer of the electron exposed image is required, as is the case with electron exposure of a photographic emulsion, before the target material can be applied. Also, since the phosphor pattern is written on the electron sensitive resist with the screen support member 10 and grid 7 assembled beforehand and with all of the electrical conditions being such as to exactly simulate those in the finished tube, the printed pattern is automatically exactly tailored to the particular grid and exactly registered with that ultimately to be traced in the finished tube, thereby eliminating any need of aligning the grid with the screen pattern in the finished tube. Moreover, by merely eliminating the application of phosphor, the method herein described provides a direct and exact way of making a permanent embossed or three dimensional record of the scan pattern of the tracing electron beam, in terms of exposed areas of resist. Such a permanent image may of course be usefully employed in ways other than above described, for example as a photographic master image in light ray printing of screens.

It will be appreciated by those skilled in the art that the invention may be carried out in various ways and may take various forms and embodiments other than those illustrative embodiments heretofore described. It is to be understood therefore that the scope of the invention is not limited by the details of the foregoing description, but will be defined in the following claims.

What we claim as new and desire to secure by Letters Patent of the United States is:

1. In the art of making a screen for a cathode ray tube of the type having an electron beam and an electron permeable grid between which and the screen is formed an accelerating electron field and wherein the screen consists of a target material adapted to be scanned by the electron beam, the steps comprising applying to the screen support member of the tube a coating of an electron-sensitive target material-retainable resist, exposing said resist with an electron beam in a pattern corresponding to the scan pattern of the beam of the cathode ray tube, applying said target material to at least the electron exposed portions of the resist, and removing the unexposed portions of the resist.

2. The method of making a cathode ray tube target having elements of target material arranged in a desired pattern comprising coating a support member with a layer of a resist capable of being rendered relatively insoluble when subjected to bombardment by electrons and comprising a solution in an evaporable solvent of polyvinyl alcohol sensitized with ammonium dichromate, drying the solution to evaporate the solvent, exposing the resist with an electron beam and thereby insolubilizing selected areas of the resist corresponding to said desired pattern, applying a desired target material to the resist, and removing unexposed portions of the resist together with the target material applied to said unexposed portions.

3. The method of making a cathode ray tube screen having phosphor elements arranged in a desired pattern comprising coating a support member having an electrically conductive surface with a layer of a resist capable of being rendered relatively insoluble when subjected to bombardment by electrons and comprising approximately by weight 3 to 7 parts polyvinyl alcohol, 100 parts water, 40 to 70 parts ethyl alcohol and ¼ to 3 parts alkaline dichromate, removing the evaporable portions of the coating, exposing and thereby insolubilizing selected areas of the resist with an electron beam, applying a desired phosphor to the resist, and removing unexposed portions of the resist together with the phosphor applied to said unexposed portions.

4. The method of making a cathode ray tube screen having a plurality of different target materials arranged in predetermined patterns comprising forming on a support member a coating of an electron-sensitive target material-retainable resist, tracing on said resist with an electron beam a pattern corresponding to the desired pattern of a first target material, applying said first target material to at least the exposed portions of said resist, removing the unexposed portions of the resist together with any of said first target material attached thereto, recoating the support member and elements of resist and first target material thereon with an additional coating of resist, tracing on said additional coating of resist with an electron beam a pattern corresponding to the desired pattern of a second target material, applying said second target material to at least the exposed portions of the second coating of resist, removing the unexposed portions of the second coating of resist together with any of said second target material attached thereto, and repeating the last-mentioned four steps for all remaining target materials.

5. The method of making a cathode ray tube screen having a plurality of different colored light emitting phosphors arranged in predetermined patterns comprising coating a screen support member with an electron-sensitive phosphor-retainable resist, exposing to electron bombardment the portion of the resist corresponding to the desired pattern of a first phosphor capable of emitting light of a first color when illuminated by electrons, applying to the resist said first phosphor, removing the unexposed portions of the resist together with the portions of the first phosphor associated therewith, recoating the support member and elements of resist and first phosphor remeaning thereon with an additional coating of said resist, exposing to electron bombardment the portion of the additional coating of resist corresponding to the desired pattern of a second phosphor capable of emitting light of a second color when illuminated by electrons, applying to the additional coating of resist said second phosphor, removing the unexposed portions of the additional coating of resist together with the portions of the second phosphor associated therewith, and repeating the last-mentioned four steps for all remaining phosphors.

6. The method of making a three dimensional record of the scan pattern of an electron beam comprising coating a support member having an electrically conductive surface with a solution of a resist capable of being rendered relatively insoluble when subjected to bombardment by electrons and comprising approximately by weight 3 to 7 parts polyvinyl alcohol, 100 parts water, 40 to 70 parts ethyl alcohol, and ¼ to 3 parts alkaline dichromate sensitizer selected from the class consisting of ammonium and potassium dichromate, drying the resist solution, exposing the resist with an electron beam and thereby rendering relatively insoluble selected areas of the resist, and dissolving away the unexposed portions of the resist.

References Cited in the file of this patent

UNITED STATES PATENTS

| 2,610,120 | Minsk et al. | Sept. 9, 1952 |
| 2,727,828 | Law | Dec. 20, 1955 |
| 2,733,366 | Grimm et al. | Jan. 31, 1956 |
| 2,747,997 | Smith et al. | May 29, 1956 |

OTHER REFERENCES

Symposium on "Utilization of Radiation From Fission Products," Harwell, A.E.R.E., C/R 1231, page 117, February 23–24, 1953.